United States Patent
De Gregorio et al.

(10) Patent No.: US 12,005,592 B2
(45) Date of Patent: Jun. 11, 2024

(54) CREATING TRAINING DATA VARIABILITY IN MACHINE LEARNING FOR OBJECT LABELLING FROM IMAGES

(71) Applicant: ALMA MATER STUDIORUM UNIVERSITA' DI BOLOGNA, Bologna (IT)

(72) Inventors: Daniele De Gregorio, Termoli (IT); Luigi Di Stefano, Bologna (IT)

(73) Assignee: ALMA MATER STUDIORUM UNIVERSITA' DI BOLOGNA, Bologna (IT)

( * ) Notice: Subject to any disclaimer, the term of this patent is extended or adjusted under 35 U.S.C. 154(b) by 492 days.

(21) Appl. No.: 17/603,175

(22) PCT Filed: Mar. 21, 2020

(86) PCT No.: PCT/IB2020/052657
§ 371 (c)(1),
(2) Date: Oct. 12, 2021

(87) PCT Pub. No.: WO2020/212776
PCT Pub. Date: Oct. 22, 2020

(65) Prior Publication Data
US 2022/0203548 A1 Jun. 30, 2022

(30) Foreign Application Priority Data
Apr. 18, 2019 (IT) .................. 102019000006070

(51) Int. Cl.
*B25J 9/16* (2006.01)
*G06T 7/00* (2017.01)
(Continued)

(52) U.S. Cl.
CPC ............ *B25J 9/1697* (2013.01); *B25J 9/1612* (2013.01); *G06T 7/70* (2017.01); *G06T 7/97* (2017.01);
(Continued)

(58) Field of Classification Search
CPC .................. B25J 9/1612; B25J 9/1697; G05B 2219/40564; G05B 2219/40613;
(Continued)

(56) References Cited

U.S. PATENT DOCUMENTS 8,103,085 B1 * 1/2012 Zadeh ..................... G06T 7/001
382/141
10,049,308 B1 8/2018 Dhua et al.
(Continued)

FOREIGN PATENT DOCUMENTS

WO 2019045779 A1 3/2019

OTHER PUBLICATIONS

De Gregorio, D. et al., "Semi-Automatic Labeling for Deep Learning in Robotics", arxiv.org, Cornell University Library, 201 Olin Library Cornell University Ithaca, NY 14853,05, arXiv:1908.01862, Aug. 5, 2019.
(Continued)

*Primary Examiner* — Jaime Figueroa
*Assistant Examiner* — Zachary Joseph Wallace
(74) *Attorney, Agent, or Firm* — Joseph C. Zucchero; Carolyn S. Elmore; Elmore Patent Law Group, P.C.

(57) ABSTRACT

It is described an image labeling system (100) comprising: a support (2) for an object (3) to be labeled; a digital camera (1) configured to capture a plurality of images of a scene including said object (3); a process and control apparatus (5) configured to receive said images and generate corresponding labeling data (21-24, L1-L4) associated to said object (3); a digital display (4) associated with said support (2) and
(Continued)

connected to the process and control apparatus (5) to selectively display additional images (7-13) selected from the group comprising: first images (7-11) in the form of backgrounds for the plurality of images and introducing a degree of variability in the scene; second images (12) indicating position and/or orientation according to which place said object (3) by a user on the support (2); third images (13) to be captured by the digital camera (1) and provided to the process and control apparatus (5) to evaluate a position of the digital camera (1) with respect the digital display (4); fourth images to be captured by the digital camera (1) and provided to the process and control apparatus (5) to evaluate at least one of the following data of the object (3): position, orientation, 3D shape.

10 Claims, 6 Drawing Sheets

(51) Int. Cl.
  *G06T 7/70* (2017.01)
  *G06V 10/774* (2022.01)
  *G06V 10/44* (2022.01)
  *G06V 20/10* (2022.01)
(52) U.S. Cl.
  CPC ........ *G06V 10/7747* (2022.01); *G06V 10/454* (2022.01); *G06V 20/10* (2022.01)
(58) Field of Classification Search
  CPC .......... G06N 20/00; G06T 2207/20081; G06T 2207/20084; G06T 2207/30164; G06T 7/50; G06T 7/70; G06T 7/97; G06T 7/74; G06V 10/454
  See application file for complete search history.

(56) References Cited

U.S. PATENT DOCUMENTS

| | | | | |
|---|---|---|---|---|
| 10,289,925 | B2* | 5/2019 | Farooqi | G06F 18/241 |
| 10,297,070 | B1* | 5/2019 | Zhu | G06V 30/19173 |
| 11,227,144 | B2* | 1/2022 | Namiki | G06V 20/647 |
| 2015/0310306 | A1* | 10/2015 | Song | G06V 10/75 |
| | | | | 382/159 |
| 2017/0161592 | A1 | 6/2017 | Su et al. | |
| 2019/0347520 | A1* | 11/2019 | Sato | G06V 20/10 |
| 2020/0211220 | A1* | 7/2020 | Ilic | G06F 18/214 |
| 2020/0302241 | A1* | 9/2020 | White | G06V 10/772 |
| 2021/0227126 | A1* | 7/2021 | Se | H04N 23/61 |
| 2021/0319363 | A1* | 10/2021 | Gillberg | G06V 10/774 |

OTHER PUBLICATIONS

Dwibedi, D. et al., "Cut, Paste and Learn: Surprisingly Easy Synthesis for Instance Detection", 2017 IEEE International Conference on Computer Vision (ICCV), DOI: 10.1109/ICCV.2017.146, Oct. 22-29, 2017, 1310-1319.

Kehl, W. et al., "SSD-6D: Making RGB-Based 3D Detection and 6D Pose Estimation Great Again", 2017 IEEE International Conference on Computer Vision (ICCV, DOI: 10.1109/ICCV.2017.169, Oct. 22-29, 2017, 1530-1538.

* cited by examiner

CREATING TRAINING DATA VARIABILITY IN MACHINE LEARNING FOR OBJECT LABELLING FROM IMAGES

TECHNICAL FIELD

The present invention relates to an image labeling system.

BACKGROUND OF THE INVENTION

Machine Learning systems, such as an example, Neural Networks, have to be trained with data and the availability of such data is of crucial relevance. Particularly, there are data-driven models in which the fundamental data type is the image. According to the known techniques, the images to be used to train such models are hand-labeled by humans.

Image labeling means generating content and associating it to the image.

As an example, the content can be series of digital boxes around objects of interest present in the images. Further examples of labeling are "colouring" each pixel differently or providing a text description in a way closely related to the content of the scene (e.g. to the objects within it).

Examples of labeled images are shown in the document A. Redmon et al., «YOLO9000: better, faster, stronger» IEEE conference on computer vision and pattern recognition, 2017 (http://pjreddie.com/yolo9000/).

Moreover, it has been noticed that to properly train data-driven models with labeled images of objects of interest it is necessary to rearrange the objects or to change the image background on which the objects are placed, so introducing a certain degree of variability in the scene. The introduction of this kind of variability, especially for synthetic generated images, within the dataset is known in the literature as Domain Randomization.

Document P. Tobin et al., «Domain Randomization for Transferring Deep Neural Networks from Simulation to the Real World» IEEE/RSJ International Conference on Intelligent Robots and Systems (IROS), 2017, clarifies that Domain Randomization is fundamental in order to train effective models. Particularly, in the above indicated document Domain Randomization is used with synthetic data, that is 3D Renders that simulate the real scene.

Domain Randomization is also discussed, inter alia, in document D. De Gregorio et. al, «LOOP: Leveraging on a generic Object detector for Orientation Prediction» Annex-1, 2018, where this technique is applied on real data instead.

The Applicant has noticed that thousands of labeled images can be needed to train the most recent Deep Learning models and whenever the working conditions change (e.g. the objects of interest, the lighting conditions of the scene, the worktop texture etc.) it is necessary to re-train/reconfigure these models. As an example, it is considered a situation in which five thousands images have to be labelled with reference to twelve different objects of interest. An average user would take about four minutes to draw the twelve boxes in an image (considering that for each box must carefully choose the category of belonging); the total of man hours would be over 300 hours (4 min×5000).

The example above shows as image labelling procedures performed according to the known techniques are time consuming and expensive.

The following further prior art documents are cited in the following description to explain particularly aspects of the invention:

[1] F. A. Redmon et al., «YOLO9000: better, faster, stronger» IEEE conference on computer vision and pattern recognition, 2017;
[2] C. Liu et al., «Ssd: Single shot multibox detector» European conference on computer vision, 2016;
[3] D. Xiang et al., «Posecnn: A convolutional neural network for 6d object pose estimation in cluttered scenes» Arxiv, 2017;
[4] L. V. Rad et al., «BB8: a scalable, accurate, robust to partial occlusion method for predicting the 3D poses of challenging objects without using depth,» Proceedings of the IEEE International Conference on Computer Vision, 2017;
[5] B. G. J. Godard et al., «Unsupervised monocular depth estimation with left-right consistency,» Proceedings of the IEEE Conference on Computer Vision and Pattern Recognition, 2017;
[6] Y. A. L. Chen et al., «Deeplab: Semantic image segmentation with deep convolutional nets, atrous convolution, and fully connected crfs.,» IEEE transactions on pattern analysis and machine intelligence, 2018.
[7] G. R. He et al., «Mask r-cnn,» Proceedings of the IEEE international conference on computer vision, 2017;
[8] L. S. Kalashnikov et al., «Qt-opt: Scalable deep reinforcement learning for vision-based robotic manipulation,» Arxiv, 2018.

SUMMARY OF THE INVENTION

The present invention addresses the problem of providing an image labelling system, which allows reducing the human intervention in the labeling procedure.

According to a first object, the present invention relates to an image labelling system as defined by the appended independent claim 1. Particular embodiments of the system are defined by the dependent claims 2-10.

BRIEF DESCRIPTION OF THE DRAWINGS

Further characteristics and advantages will be more apparent from the following description of a preferred embodiment and of its alternatives given as an example with reference to the enclosed drawings in which.

DETAILED DESCRIPTION

Figure 1:
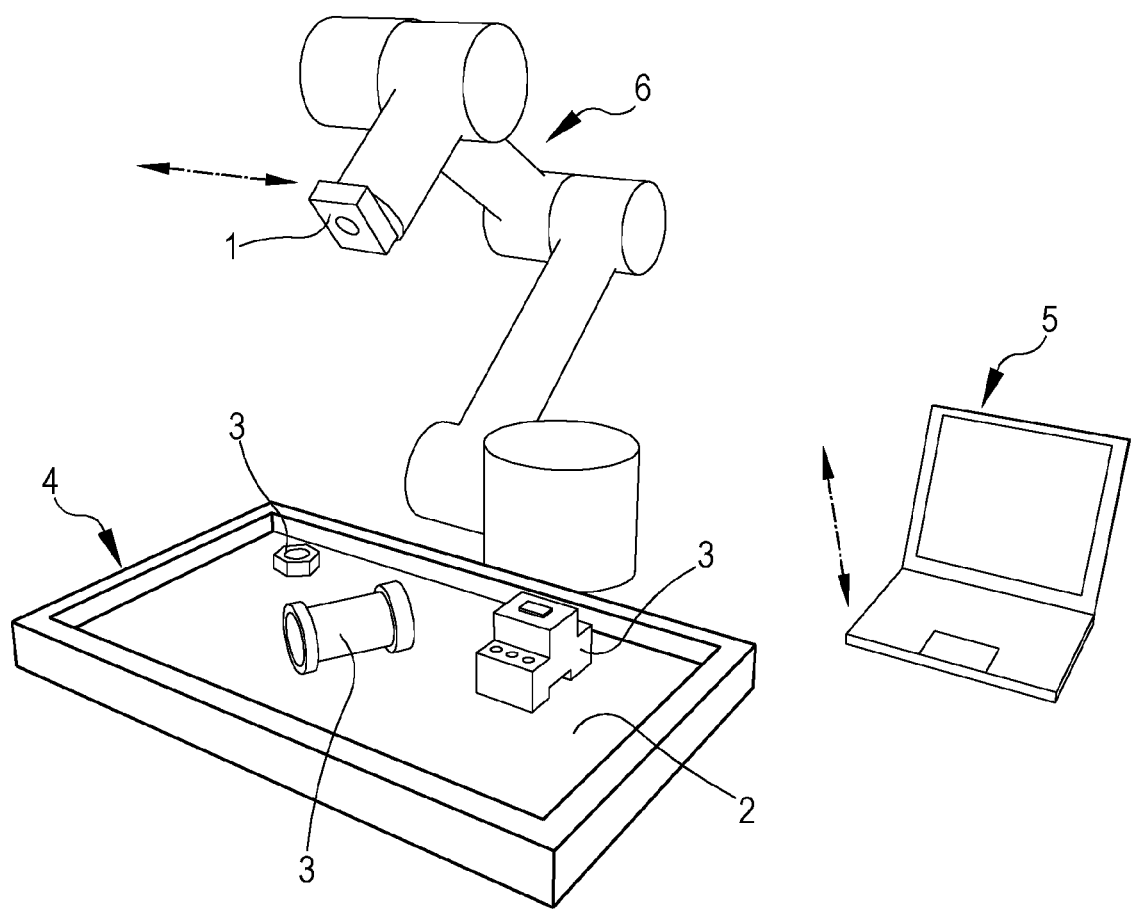
FIG. 1 schematically shows an embodiment of an image labeling system comprising a digital camera, a digital display and a process and control apparatus.

FIG. 1 schematically shows a first embodiment of an image labeling system 100 comprising: a digital camera 1, a support 2 for at least one object 3 to be labeled and a digital display 4. The image labeling system 100 (hereinafter, also "system 100", for the sake of brevity) is also provided with a process and control apparatus 5 connected to the digital camera 1 and the digital display 4 (in wireless and/or wired connections).

Particularly, the process and control apparatus 5 can comprise one or more computers having suitable human interfaces, graphical interfaces and memories storing software instructions. The software instructions stored into the process and control apparatus 5 allows the system 100 performing an object labeling procedure.

For the purpose of the present invention "image labeling" means associating to an image a content, which can be needed to train a machine learning system.

The digital camera 1 is configured to capture a plurality of images of one or more objects 3 positioned on the support 2. As an example, the digital camera 1 can be a video camera, a still camera, a thermal camera, an infrared camera or a 3D camera. The digital camera 1 is preferably movable in order to assume different positions and orientations in the space with reference to the object 3.

Particularly, the support 2 can be a transparent screen, which can be part of the digital display 4. The digital display 4 can be of a known type and, preferably, it is an E-INK Display showing the advantage that it well simulates a surface similar to paper, since it is not backlit.

Preferably, the system 100 can be configured to perform an automatic labeling of the object of interests. In this case, the digital camera 1 is a calibrated camera, i.e. the optical parameter associated to the digital camera 1 are known and, can be stored in the memory of the process and control apparatus 5. Moreover, to perform an automatic labeling, the position and orientation of the digital camera 1, in space, are known; e.g. the corresponding data are stored in the memory of the process and control apparatus 5. Moreover, the positions and orientations of the objects 3 are also known and, particularly, stored in the memory of the process and control apparatus 5. Furthermore, according to a preferred example, also the 3D shapes of the objects 3 are known data (as, for example as 3D CAD Models), or they can be reconstructed by a know Structure From Motion technique based on the knowledge of the position and orientation of the digital camera 1.

As exemplary shown in FIG. 1, the system 100 can be provided with a movable support 6 for supporting and displacing the digital camera 1. The movable support 6 can be a mechanical manipulator which, particularly, is able to move the digital camera 1 and track its position and orientation in a Common Reference Frame (that is originated in the base of the mechanical manipulator itself). The movable support 6 is controlled by the process and control apparatus 5.

The mechanical manipulator 6 can be a robot having at least one degree of freedom. As an example, the manipulator 6 can be a robot selected from the following group: a cartesian/gantry robot, a cylindrical robot, a spherical robot, a SCARA robot, an articulated robot (robotic arms), a parallel robot or a passive arm.

The robot 6 is able to control with submillimeter precision the position and orientation of the digital camera 1. The passive arm, which is basically a robot without motors (i.e. movable by a human operator), can represent a portable solution having a precision equivalent to that of the robot 6.

Alternatively, the digital camera 1 can be hand supported (i.e. no movable support 6 is employed) but, in this case, the digital camera 1 has, preferably, an embedded Localization Capability, i.e. the capability to localize itself in the environment by means of on-board sensors. As an example, the digital camera 1 is provided with an Inertial Measurement Unit (IMU) analogous to those included in currently available smartphones and a specific software (resident on the digital camera 1 or in the process and control apparatus 5) allows computing position and orientation of the digital camera 1 also taking into consideration the data provided by the IMU together with acquired images.

According to another embodiment, it is possible to maintain the digital camera 1 in a fixed position and to move the digital display 4 by means of a mechanical manipulator 6, which can be analogous to that described above.

The digital display 4 is, as an example, mounted in front of the movable support 6 in such a way as each of the screen points of the digital display 4 has a known position; which can be expressed in the Common Reference Frame. The digital display 4 can accommodate the objects 3 on its transparent screen 2 which will then have a known position and orientation with respect to the mechanical manipulator 6 (i.e. the digital camera 1).

The digital camera 1 is configured to capture at least an image of scene including the digital display 4 and one or more objects 3 placed on the support 2. The process and control apparatus 5 is configured (with suitable software instructions) to receive said image and generate labeling data associated to the object 3 as represented in the captured image of the captured scene.

Figure 2:
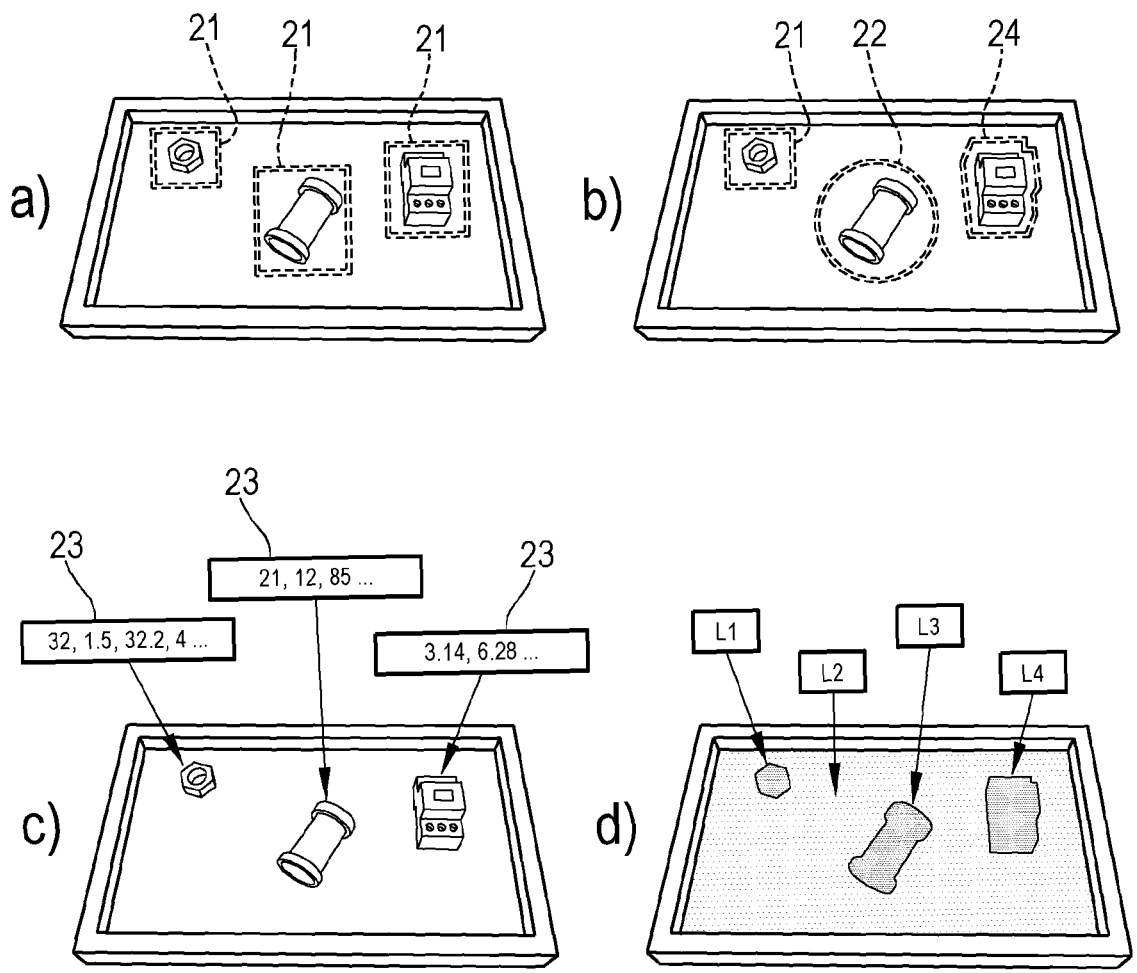
FIG. 2 shows examples of labeling data obtainable by said image labeling system.

With reference to FIG. 2, the labeling data can be selected from the following data group: a text description of the scene represented in the captured image (not represented in the drawings), a 2D Bounding Box 21, a 3D Bounding Box and a 3D Pose information 23 (i.e. numerical data). Other type of labeling data comprise: a Depth Map and a Semantic Map (symbolically represented in FIG. 2D as labels L1-L4). Moreover, alternatively to the Boxes other type of Bounding Contours can be used, such as an example, 2D Bounding Circles 22 or 2D Bounding Polygons 24. It is also noticed that, alternatively to the 3D Bounding Boxes, other 3D Bounding Shapes can be employed. A 2D Bounding Box 21 is rectangular digital frame around the object 3 represented in the captured image. 2D Bounding Boxes 21 are useful, as an example, to train an Object Detector as described in the above cited prior art documents [1] and [2].

3D Bounding Boxes and 3D Pose information 23 of each object in the scene (related to the Camera Coordinate System) are useful, as an example, to train a Pose Estimator as described in the above cited documents [3] and [4].

A Depth Map is an image in which each pixel represents the distance of that point w.r.t. to the digital camera 1, which could be used to train a Monocular-Stereo as described, according to an example, in the previously cited document [5].

A higher level of detail can be reached with Semantic Maps (FIG. 2d), i.e. an image in which each pixel is "coloured" with the category of belonging of the underlying object. Semantic Maps can be used to train a generic Semantic Segmentator as described in the above indicated document [6]. Moreover, Semantic Maps can be used to train a fine-grained Object Detector as described in the previously listed document [7].

It is noticed that the generated labeling data are not necessarily displayed by the digital display 4, and that are shown in FIG. 2 as visualized on the digital display 4 just for the sake of clarity.

It is noticed that the digital display 4 is configured to display additional images to be employed in the label procedure of the objects 3.

According to a first example, the additional images play the role of background images for the plurality of images of the objects 3 to be captured by the digital camera 1. In detail, digital display 4 is configured to selectively display a different background image for each captured scene including the objects 3.

Particularly, the digital display 4 can change colour and/or texture (i.e. pattern) of the displayed background images. More particularly, the digital display 4 can change colour and/or texture (i.e. pattern) of the displayed background image repeatedly in order to introduce the required variability.

The possibility of selectively displaying different background images allows implementing real Domain Randomization. The importance and the advantages of performing a real Domain Randomization have been discussed in the above cited prior art documents of P. Tobin et al. (Domain Randomization for Transferring Deep Neural Networks from Simulation to the Real World) and D. De Gregorio et. al, (LOOP: Leveraging on a generic Object detector for Orientation Prediction).

Figure 3:
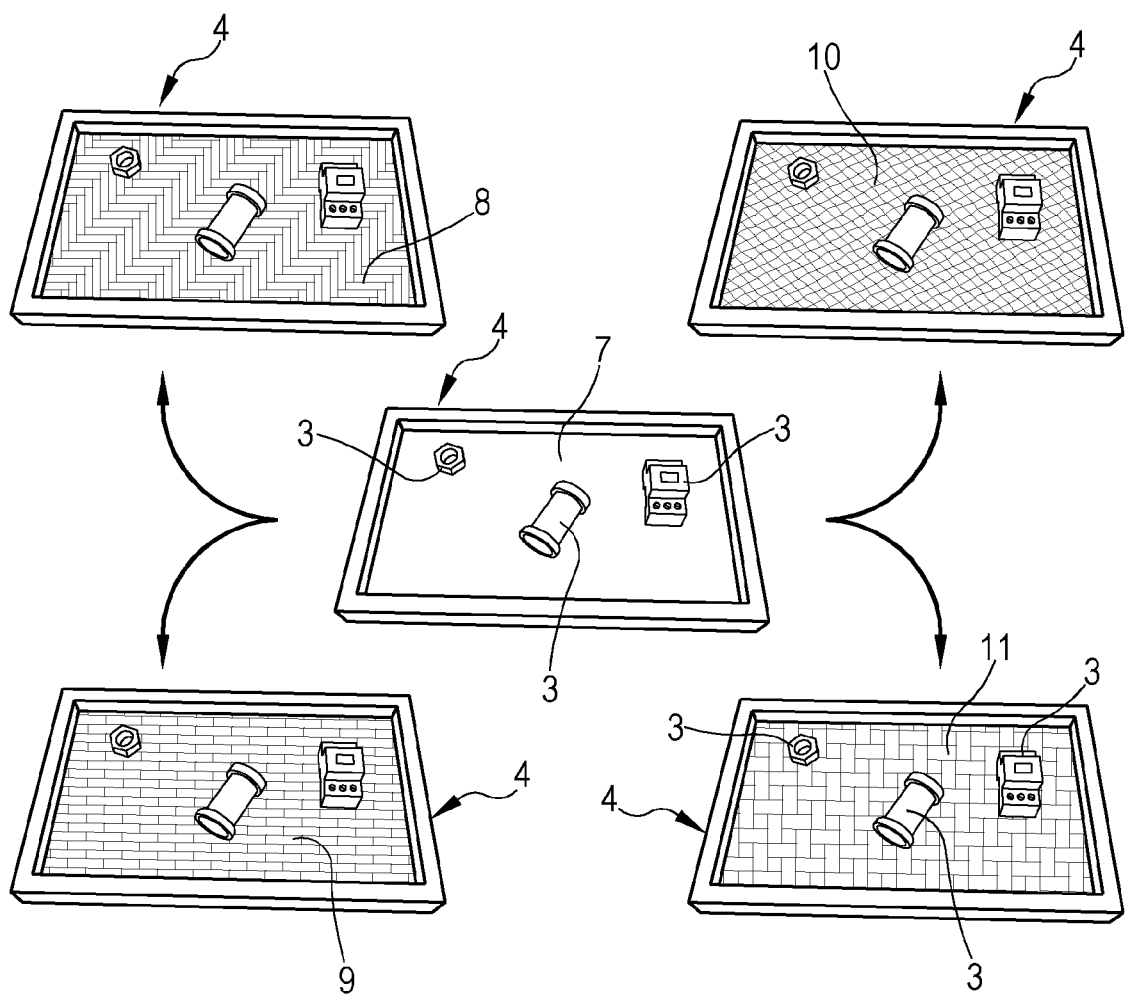
FIG. 3 shows examples of background images produced by said digital display of said image labeling system.

FIG. 3 shows examples of different background images 7-11 that can be displayed by the digital display 4.

According to an example of operation of the system 100, a user places one or more objects 3 on the transparent screen 2 of the digital display 4. According to an example, the user provides orientation and position data of the objects 3 to the process and control apparatus 5 or, according to another example, the orientation and position data of the objects 3 can be automatically evaluated. The process and control apparatus 5 manages the subsequent steps by controlling the digital display 4, the digital camera 1 and the mechanical manipulator 6 (if provided).

Particularly, the digital display 4 displays a first background image 7 (FIG. 2) and the mechanical manipulator 6 assumes a first position. Then, the digital camera 1 captures a first image of the scene comprising the objects 3 with the first background image 7.

If an automatic labeling is performed, the process and control apparatus 5 processes the first image (taking into account the known position and orientation data of the digital camera 1 and the objects 3) and associates labeling data to each object 3. As an example, a 2D Bounding Box 21 is generated around each object 3 and the corresponding coordinates are stored in connection with each portion of the image including the specific object 3.

If the labeling is not performed automatically, the operator may act on the process and control apparatus 5 (e.g. via a suitable interface) to introduce the data necessary generate the specific labeling data.

Moreover, in a further exemplary step, the digital display 4 changes the visualized background and displays a second background image 8, while the object 3 and the digital camera 1 are maintained in the position and orientation already assumed. The digital camera 1 captures a second image of the scene comprising the objects 3 on the second background image 8. The process and control apparatus 5 processes the second image and associates the corresponding labeling data in a manner analogous to the one described above.

The above-described steps can be repeated for the other background images 9-11 to label the objects 3 in different background conditions. Preferably, the labeling as described above can be also performed by capturing images of a plurality of scenarios in which the digital camera 1 and the objects 3 have assumed different relative positions and orientations, in order to collect a large amount of labeled data in connection with different images of the scenario including the objects 3.

The plurality of captured images together with the labeling data associated to each objects 3 form a dataset to be employed in training procedures. Particularly, the dataset obtained with the system 100 can be employed in training procedures in the field of Artificial Intelligence, and in particular Machine Learning and Deep Learning, in which the data availability, with which to perform models such as Neural Networks, is of crucial relevance. More specifically, the obtained dataset can be used to train data-driven models (i.e. a model which train/reconfigure itself using a dataset and not a handcrafted algorithm) in which the fundamental data type is the image.

Figure 4:
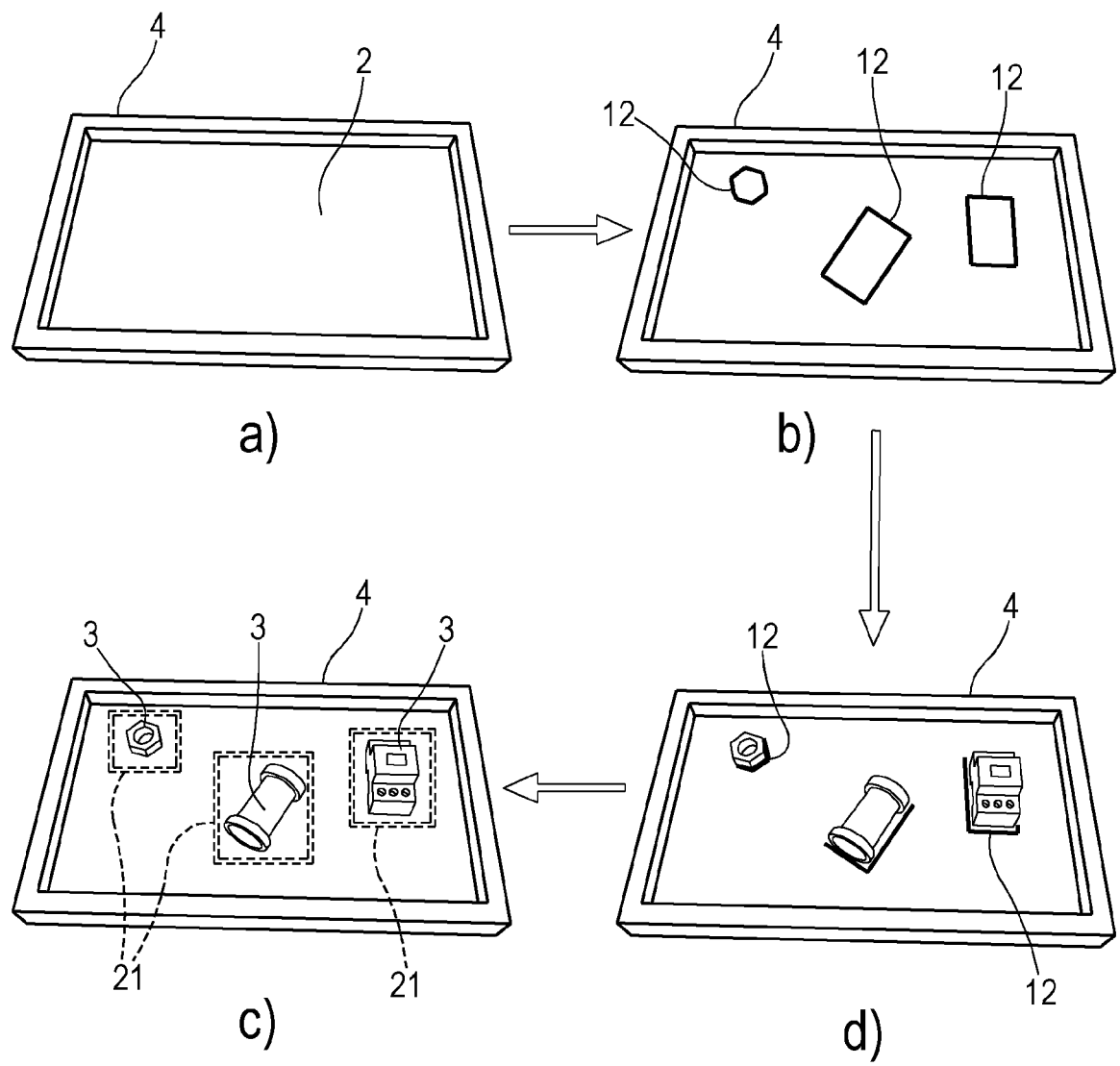
FIG. 4 shows examples of placeholders generated by said digital display according to a particular embodiment of said system.

FIG. 4 refers to a second example of additional images which can be generated by the digital display 4 (in addition or alternatively to the background images 7-11). According to this second example, the digital display 4 is controlled in such a way to display placeholders 12, i.e. images that indicate the position and, preferably, the orientation in which to place each object on the transparent screen 2 of the digital display 4. As an example, the placeholder 12 represents by a continuous line the projection of the object 3 on a plane corresponding to the transparent screen 2. Particularly, the placeholders 12 can be generated starting from shape data of the objects 3 available to the process and control apparatus 5.

The visualization of placeholders 12 allows avoiding that the process and control apparatus 5 has to compute the position and orientation of the objects 3 on the digital display 4 from the images captured by the digital camera 1.

FIG. 4a shows the digital display 4 without any visualization; FIG. 4c shows the placeholders 12 as displayed; FIG. 4c shows the objects 3 (of different types) placed in the corresponding placeholders 12.

It is observed the exact location of each pixel of the digital display 4 with respect to the digital camera 1 is known to the process and control apparatus 5 and this allows generating associated data (i.e. labeling data). Particularly, FIG. 4d also shows the labeling data 21 (i.e. associated data under the form of 2D bounding boxes) generated by the process and control apparatus 5.

Figure 5:
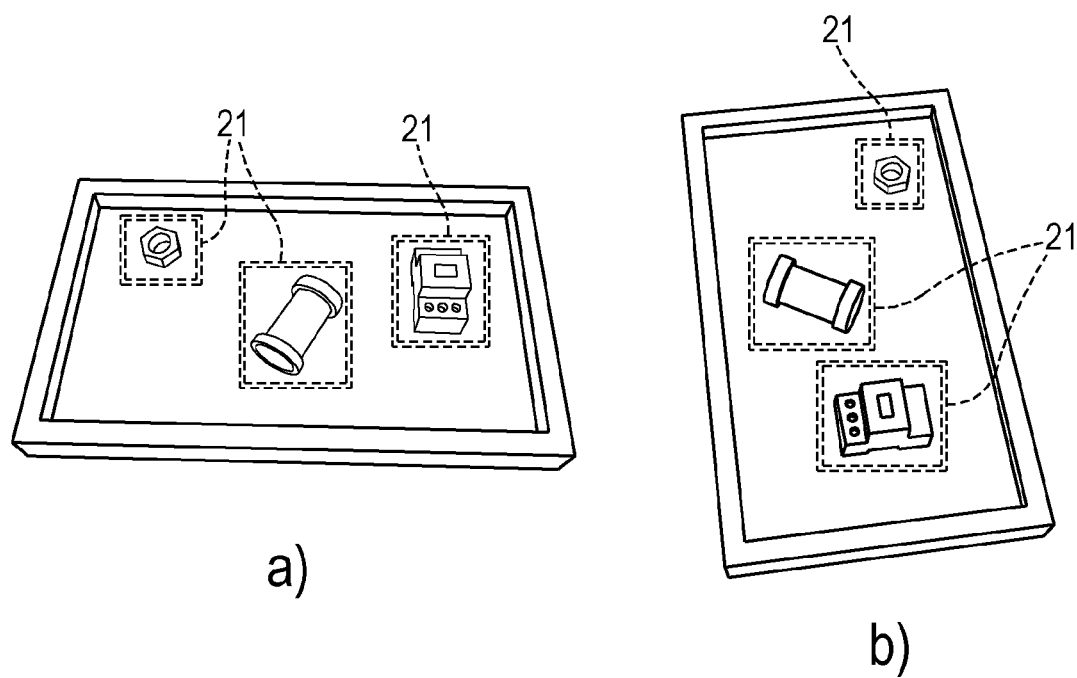
FIG. 5 shows examples of 2D bonding boxes generated by said system according to two different point of views.

It is further noticed that, thanks to the use of placeholders 12 together with the knowledge of the relative position between the digital camera 1 and the digital display 4, it is possible to generate associated content consistent and correctly superimposed on the objects 3 of the scene. An example of said consistent and correctly superimposed associated content (i.e. labelling data) is shown in FIG. 5, where different 2D Bonding Boxes 21 are coherently generated across two different viewpoints (FIGS. 5a and 5b) due, as an example, to different positions assumed by the digital camera 1 with respect to the digital display 4.

Figure 6:
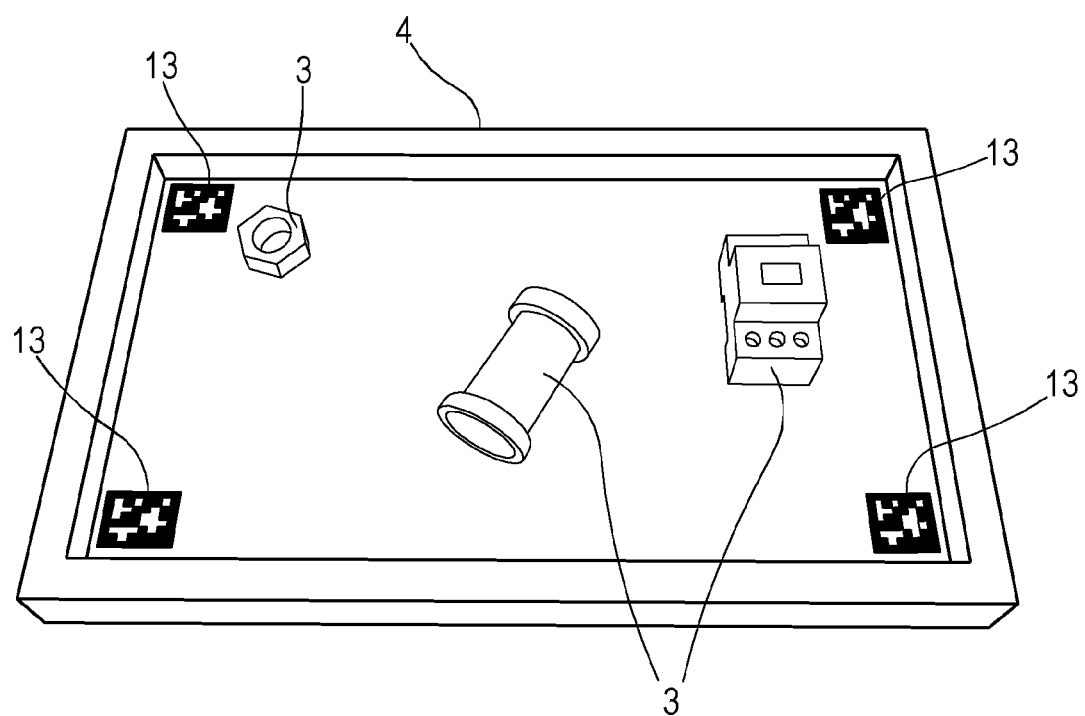
FIG. 6 refers to a further embodiment of said system wherein markers are employed to allow tracking of the digital camera.
Figure 7:
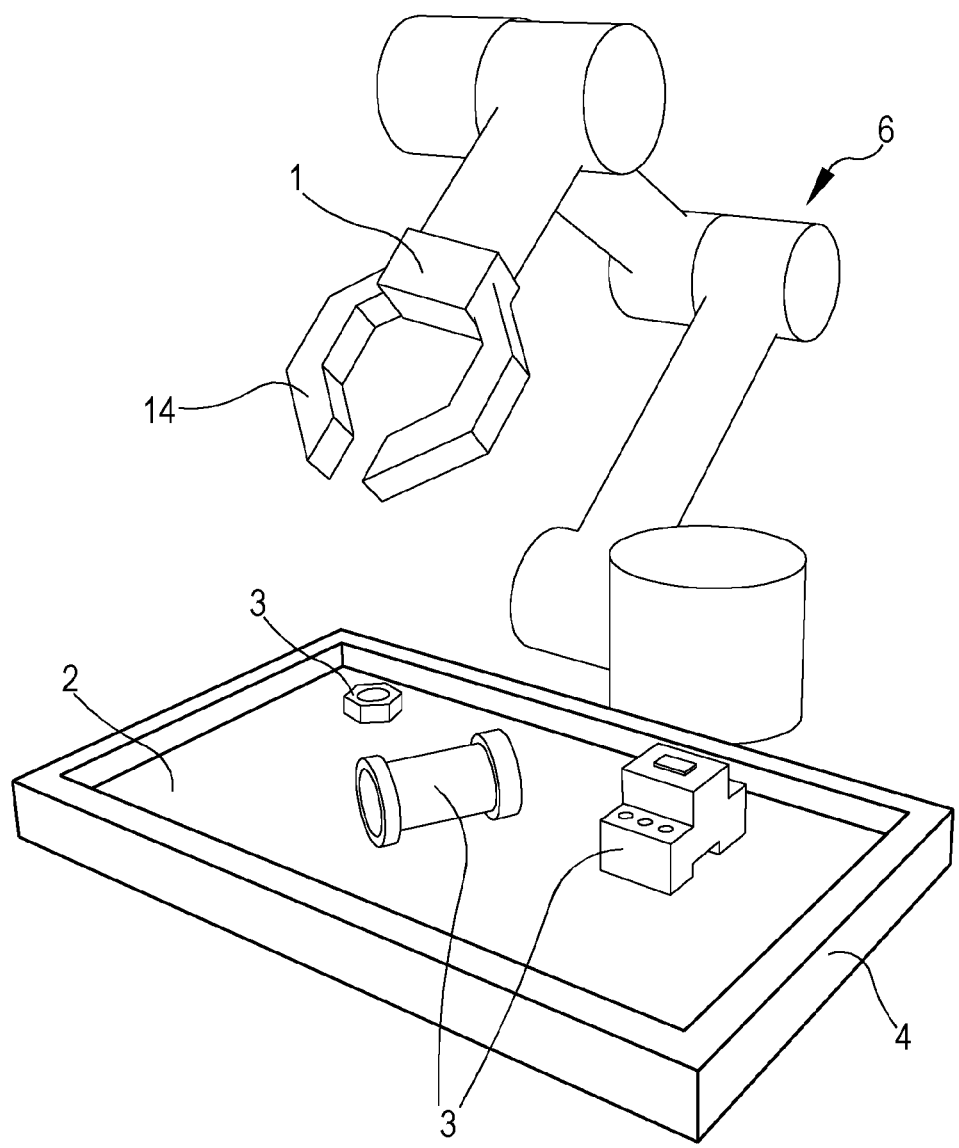
FIG. 7 refers to another embodiment of said system wherein a mechanical manipulator provided with a gripper is employed.

FIG. 6 refers to a third example of additional images which can be generated by the digital display 4 (in addition or alternatively to the background images 7-11 and the placeholders 12).

According to this third example, the process and control apparatus 5 is configured to control the digital display 4 to display markers 13, i.e. specific patterns, preferably, having high distinctive capability. Such markers 13 can be used by the digital camera 1 and the process and control apparatus 5 to locate the digital camera 1 by a suitable tracking algorithm. The markers 13 are particularly useful when position and orientation of the digital camera 1 cannot be obtained from a mechanical manipulator 6 or directly from the camera itself.

Particularly, the markers 13 are displayed at a certain frequency during the labeling procedure to avoid that such markers 13 could appear in the captured images so compromising the collected dataset. More particularly, the markers 13 are displayed with a frequency chosen so as the frames including the markers 13 are used for tracking, and the frames not including the markers 13 are used to form the dataset.

In accordance with a fourth example, the digital display 4 can generate (in addition or alternatively to the background images 7-11 and the markers 13) a further typology of images. Such images are captured by the digital camera 1 after the objects 3 have been placed on the support 2 and are provided to the process and control apparatus 5. The images so captured by the digital camera 1 are processed by the process and control apparatus 5 to allow such apparatus evaluating (by means of a suitable software, executing a corresponding algorithm) at least one of the following data of the objects 3: position, orientation, 3D shape of the object. Particularly, the images employed according to the fourth example can be specific colours assumed by the digital display 1 that allow light up the objects 3. Algorithms that allow reconstructing the position, orientation, 3D shape of an object from digital images of the same object under different light conditions are known to the skilled person.

A further embodiment refers to the system 100 employing as mechanical manipulator 6 a Robot, as the ones described above. In this case the mechanical manipulator 6 is provided with a gripper 14 configured to grab the object 3. The mechanical manipulator 6 having the gripper 14 can grab and rearrange the objects 3 (to capture further images) autonomously as it knows the exact position and orientation on the digital display 4.

This additional feature allows the system 100 to be fully automated, also removing the burden of an operator having to rearrange, from time to time, the scene. Moreover, the use of the gripper 14 allows the system 100 to generate mixed data, comprising images, labeling data and physical robot actions. Such mixed data are very useful for training modern systems based on Reinforcement Learning. Reinforcement learning is described in [8].

The described image labeling system 100 allows for reducing significantly the human intervention in the labeling procedure. The image labeling system 100, employing the digital display 4 producing the background images according to the first example, allows producing a dataset of labeled images according to Domain Randomization, in efficient manner, limiting time and costs of the procedure. Moreover, the described image labeling system 100 is compatible with an automatic labeling that further reduces time and costs of the labelling procedure.

As indicated in the description above, further advantages are provided by the examples relating to the placeholders 12, the markers 13 and the gripper 14. The possibility of evaluating the position and/or orientation and/or the 3D shape of the object 3 thanks to the images produced by the digital display 4 that highlights the objects 3 placed on the support 2, represents a further advantage that can be provided by the system 100.

The invention claimed is:
1. Image labeling system (100) comprising:
a support (2) for an object (3) to be labeled;
a digital camera (1) configured to capture a plurality of images of a scene including said object (3);
a process and control apparatus (5) configured to receive said plurality of images and generate corresponding labeling data (21-24, L1-L4) associated to said object (3);
a digital display (4) associated with said support (2) and connected to the process and control apparatus (5) to selectively display additional images (7-13) selected from the group comprising:
first images (7-11) in the form of backgrounds for the plurality of images and introducing a degree of variability in the scene to be captured by the digital camera (1) and processed by the process and control apparatus (5);
second images (12) indicating position and/or orientation according to which place said object (3) by a user on the support (2) in order to be captured by the digital camera (1);
third images (13) to be captured by the digital camera (1) and provided to the process and control apparatus (5) to evaluate a position of the digital camera (1) with respect the digital display (4);
fourth images to be produced when the object (3) is already placed on the support (2), captured by the digital camera (1) and provided to the process and control apparatus (5) to evaluate at least one of the following data of the object (3): position, orientation, 3D shape.

2. System (100) according to claim 1, wherein the process and control apparatus (5) is configured to cause the digital display (4) to selectively display the first images (7-11) comprising a first background image (7) having corresponding colour and texture and a second background image (10) having relative colour and/or texture different from said colour and texture of the first background image.

3. System (100) according to claim 1, wherein:
said digital camera (1) is movable with respect to said support (2);
the process and control apparatus (5) is configured to store the following data: optical parameters of said digital camera (1), position data and orientation data of said digital camera (1), position data and orientation data of said object (3).

4. System (100) according to claim 1, wherein said corresponding labeling data are selected from the following data group: text description of the scene represented in the captured image, 2D Bounding Contour (21, 22, 24), 3D Bounding Shape, 3D Pose information (23), Depth Map, Semantic Map (L1-L4).

5. System according to claim 2, further provided with a movable support (6) for supporting and displacing the digital camera (1) or the digital display (4) to capture said scene according to different point of views.

6. System according to claim 5, wherein the movable support is a mechanical manipulator (6) selected from the group: cartesian/gantry robot, cylindrical robot, spherical robot, SCARA robot, articulated robot, parallel robot.

7. System according to claim 5, wherein the movable support is a passive arm.

8. System according to claim 2, wherein digital camera (1) is hand supported and comprises a plurality of sensors to provide said position and orientation data of the digital camera (1) to the process and control apparatus (5).

9. System according to claim 1, wherein the process and control apparatus (5) is configured to display the third images (13) with a pre-established frequency to avoid that the third images (13) appear in said plurality of images of a scene including said object (3).

10. System according to claim 6, wherein the mechanical manipulator (6) further comprises a gripper (14) configured to grab the object (3).

\* \* \* \* \*